(12) United States Patent
Takagi

(10) Patent No.: US 8,406,244 B2
(45) Date of Patent: Mar. 26, 2013

(54) BASE STATION APPARATUS AND DATA RETRANSMISSION METHOD OF THE SAME

(75) Inventor: Kenki Takagi, Tokyo (JP)

(73) Assignee: NEC Corporation, Tokyo (JP)

( * ) Notice: Subject to any disclaimer, the term of this patent is extended or adjusted under 35 U.S.C. 154(b) by 991 days.

(21) Appl. No.: 12/294,149

(22) PCT Filed: Mar. 26, 2007

(86) PCT No.: PCT/JP2007/056196

§ 371 (c)(1),
(2), (4) Date: Sep. 23, 2008

(87) PCT Pub. No.: WO2007/111295

PCT Pub. Date: Oct. 4, 2007

(65) Prior Publication Data

US 2009/0034488 A1  Feb. 5, 2009

(30) Foreign Application Priority Data

Mar. 29, 2006  (JP) ................................ 2006-089791

(51) Int. Cl.
*H04L 12/28* (2006.01)
*H04B 14/04* (2006.01)
*G08C 25/02* (2006.01)

(52) U.S. Cl. .......................... 370/412; 375/243; 714/748

(58) Field of Classification Search .................. 370/329, 370/331, 332, 229, 230, 235, 335, 342, 412; 714/748, 749, 746, 47, 774, 791, 751; 375/240, 375/240.24, 240.27, 242, 219, 259, 222, 375/221, 220

See application file for complete search history.

(56) References Cited

U.S. PATENT DOCUMENTS

| | | | | |
|---|---|---|---|---|
| 6,374,117 | B1 * | 4/2002 | Denkert et al. ............... | 455/522 |
| 6,985,752 | B2 * | 1/2006 | Takano et al. ................. | 455/522 |
| 7,277,492 | B2 * | 10/2007 | Itoh ............................... | 375/259 |
| 7,676,732 | B2 * | 3/2010 | Moon et al. .................... | 714/774 |
| 2004/0184417 | A1 | 9/2004 | Chen et al. | |
| 2004/0228273 | A1 | 11/2004 | Kurobe et al. | |
| 2005/0053032 | A1 | 3/2005 | Itoh | |

FOREIGN PATENT DOCUMENTS

| | | |
|---|---|---|
| EP | 1432166 A2 | 6/2004 |
| EP | 1513356 A2 | 3/2005 |

(Continued)

OTHER PUBLICATIONS

International Search Report for PCT/JP2007/056196 mailed May 29, 2007.

(Continued)

*Primary Examiner* — Hanh N Nguyen

(57) ABSTRACT

A base station apparatus includes a buffer for temporarily storing data to be transmitted to a mobile station in a data queue corresponding to the mobile station, and a controller for performing control of retransmitting data whose retransmission is requested by a mobile station by selecting the data from a data queue corresponding to the mobile station. When retransmitting data to a mobile station, if the data storage amount in a data queue corresponding to the mobile station is equal to or larger than a predetermined threshold value, the controller performs control of making the error resistance on wireless propagation higher than that of the last data transmission to the mobile station. This makes it possible to increase the retransmission data reception success probability of a mobile station, and suppress the occurrence of retransmission control by an upper layer.

7 Claims, 4 Drawing Sheets

FOREIGN PATENT DOCUMENTS

| | | |
|---|---|---|
| JP | 2000188609 A | 7/2000 |
| JP | 2004364277 A | 12/2004 |
| JP | 2005039726 A | 2/2005 |
| JP | 2005045642 A | 2/2005 |
| JP | 2005057323 A | 3/2005 |
| JP | 2005286786 A | 10/2005 |
| JP | 2005534232 A | 11/2005 |
| WO | 0147144 A1 | 6/2001 |
| WO | 2005008946 A | 1/2005 |
| WO | 2005088917 A | 9/2005 |

OTHER PUBLICATIONS

Japanese Office Action for JP2008-507486 mailed Nov. 2, 2010.
Korean Office Action for KR10-2008-7023456 issued Jun. 28, 2010.
European search report for EP077396334.9 dated Dec. 17, 2012.

* cited by examiner

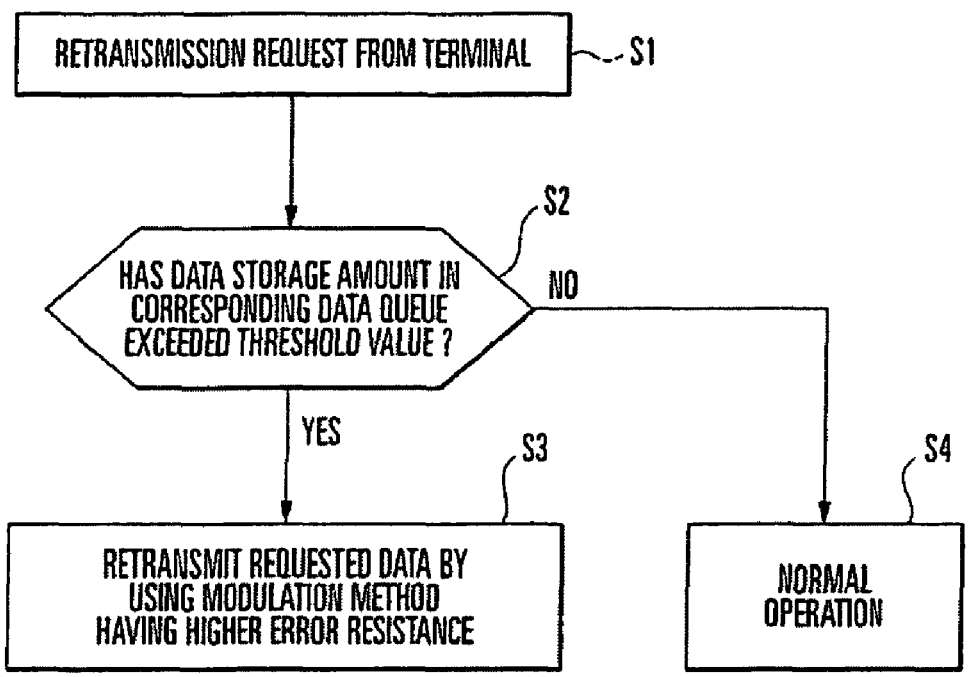
F I G. 3
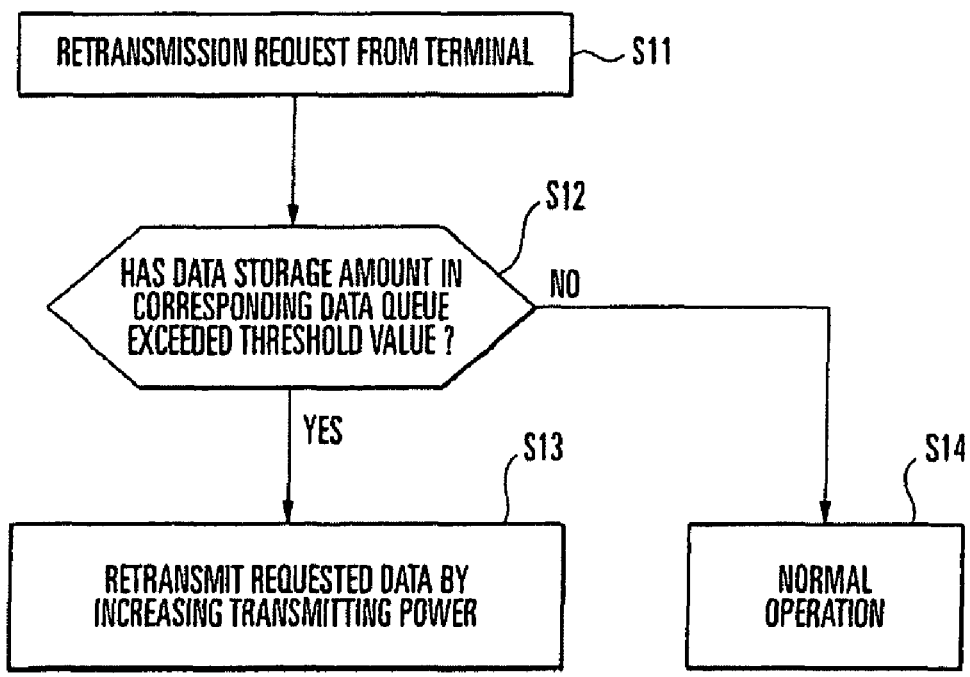
F I G. 4

BASE STATION APPARATUS AND DATA RETRANSMISSION METHOD OF THE SAME

TECHNICAL FIELD

The present invention relates to a base station apparatus and a data retransmission method of the same and, more particularly, to a base station apparatus and a data retransmission method of the same by which data to be transmitted to a mobile station is temporarily stored in a data queue corresponding to the mobile station, and data whose retransmission is requested by a mobile station is selected from the data queue corresponding to the mobile station and retransmitted.

BACKGROUND ART

The HSDPA (High Speed Downlink Packet Access) method used in the WCDMA (Wideband Code Division Multiple Access) communication system is a method that effectively uses wireless resources by allowing a plurality of mobile station terminals to share one physical channel (HS-PDSCH: High Speed Physical Downlink Shared Channel).

In the HSDPA method, hexadecimal QAM (Quadrature Amplitude Modulation) or QPSK (Quadrature Phase Shift Keying) is adaptively applied as a wireless interval modulation method in accordance with the wireless propagation environment. High-speed downlink data transmission is achieved by performing multi-code transmission using a maximum of 15 codes. Also, the HSDPA method is characterized by adopting high-speed retransmission control performed between a base station apparatus and mobile station terminal by the HARQ (Hybrid Automatic Repeat Request) method.

In the HSDPA method, high-speed retransmission control is performed between a base station apparatus and mobile station terminal by the HARQ method. Therefore, data can be correctly transferred by retransmission control whose speed is higher than that of retransmission control performed by packet data transfer of the conventional WCDMA system by RLC (Radio Link Control) or TCP (Transmission Control Protocol) as an upper layer. That is, in the HSDPA method, retransmission control conventionally performed by an upper layer is reduced, and high-speed retransmission control is performed by the HARQ method, thereby preventing the decrease (data transfer delay) in throughput caused by retransmission.

DISCLOSURE OF INVENTION

Problem to be Solved by the Invention

To achieve this function, a base station apparatus must include a buffer for temporarily storing data received from a host apparatus (base station controller) and scheduled to be transmitted to a mobile station terminal, in a data queue corresponding to the mobile station terminal, and, while retransmission data is transmitted to a mobile station terminal, must temporarily store data received from the host apparatus in a data queue corresponding to the mobile station terminal.

Accordingly, if the quality of the wireless propagation environment is low and retransmission control frequently occurs between the base station apparatus and a mobile station terminal, retransmission data occupies a large ratio of data to be transmitted by the base station apparatus. Consequently, data received from the host apparatus builds up in the data queues of the base station apparatus. On wireless communication, however, the state in which the newly received data cannot be transmitted (the state in which only retransmission data is transmitted) occurs.

Data not transmitted but stored in the data queues of the base station apparatus is discarded from the data queues if the data is not transmitted on wireless communication within a predetermined period. Since high-speed retransmission control performed between the base station apparatus and a mobile station terminal by the HARQ method adopted by the HSDPA method cannot save data discarded from the queues, retransmission control by an upper layer (RLC or TCP) must be performed. As a consequence, the throughput decreases.

That is, since high-speed retransmission control (HARQ) frequently occurs between the base station apparatus and a mobile station terminal, data stored in the data queues of the base station apparatus is discarded, and this induces retransmission by an upper layer. As a result, the throughput may decrease. Also, if the wireless propagation environment is bad and a mobile station terminal has failed to receive retransmission data although the base station apparatus retransmits the data many times, the retransmission data cannot be discarded from the data queue of the base station apparatus during the predetermined period described above. Accordingly, the data may overflow from the data queue to induce retransmission by an upper layer, and this may decrease the throughput.

Note that Japanese Patent Laid-Open No. 2000-188609 (reference 1) describes that a packet is retransmitted by using a modulation method and/or error correction method more reliable than the conventional communication method. However, reference 1 does not describe any method of controlling retransmission by monitoring data queues corresponding to individual mobile station terminals.

It is an object of the present invention to increase the retransmission data reception success probability of a mobile station terminal, thereby suppressing the occurrence of retransmission control by an upper layer.

Means for Solving the Problem

A base station apparatus according to the present invention comprises storage means for temporarily storing data to be transmitted to a mobile station in a data queue corresponding to the mobile station, and control means for performing control of transmitting, to a mobile station, data stored in a data queue corresponding to the mobile station, and control of retransmitting data whose retransmission is requested by a mobile station by selecting the data from a data queue corresponding to the mobile station. The control means includes monitoring means for monitoring a data storage amount in a data queue, and resistance adjusting means for performing, when retransmitting data to a mobile station, control of making an error resistance on wireless propagation higher than that of last data transmission to the mobile station, if the monitoring means detects that a data storage amount in a data queue corresponding to the mobile station is equal to or larger than a predetermined threshold value.

A data retransmission method of a base station apparatus according to the present invention comprises the steps of temporarily storing data to be transmitted to a mobile station in a data queue corresponding to the mobile station, transmitting, to a mobile station, data stored in a data queue corresponding to the mobile station, and retransmitting data whose retransmission is requested by a mobile station by selecting the data from a data queue corresponding to the mobile station. The step of retransmission includes the steps of checking a data storage amount in the data queue when retransmitting data to the mobile station, and performing control of making an error resistance on wireless propagation higher than that of last data transmission to the mobile station, if a result of the check indicates that the data storage amount in the data queue corresponding to the mobile station is equal to or larger than a predetermined threshold value.

Effect of the Invention

The present invention can achieve the effect of increasing the retransmission data reception success probability of a mobile station terminal, thereby suppressing the occurrence of retransmission control by an upper layer.

BRIEF DESCRIPTION OF DRAWINGS

FIG. 3 is a flowchart showing an example of a data retransmission method performed by the base station apparatus shown in FIG. 2;

FIG. 4 is a flowchart showing another example of the data retransmission method performed by the base station apparatus shown in FIG. 2;

BEST MODE FOR CARRYING OUT THE INVENTION

An exemplary embodiment of the present invention will be explained below with reference to the accompanying drawings.

Figure 1:
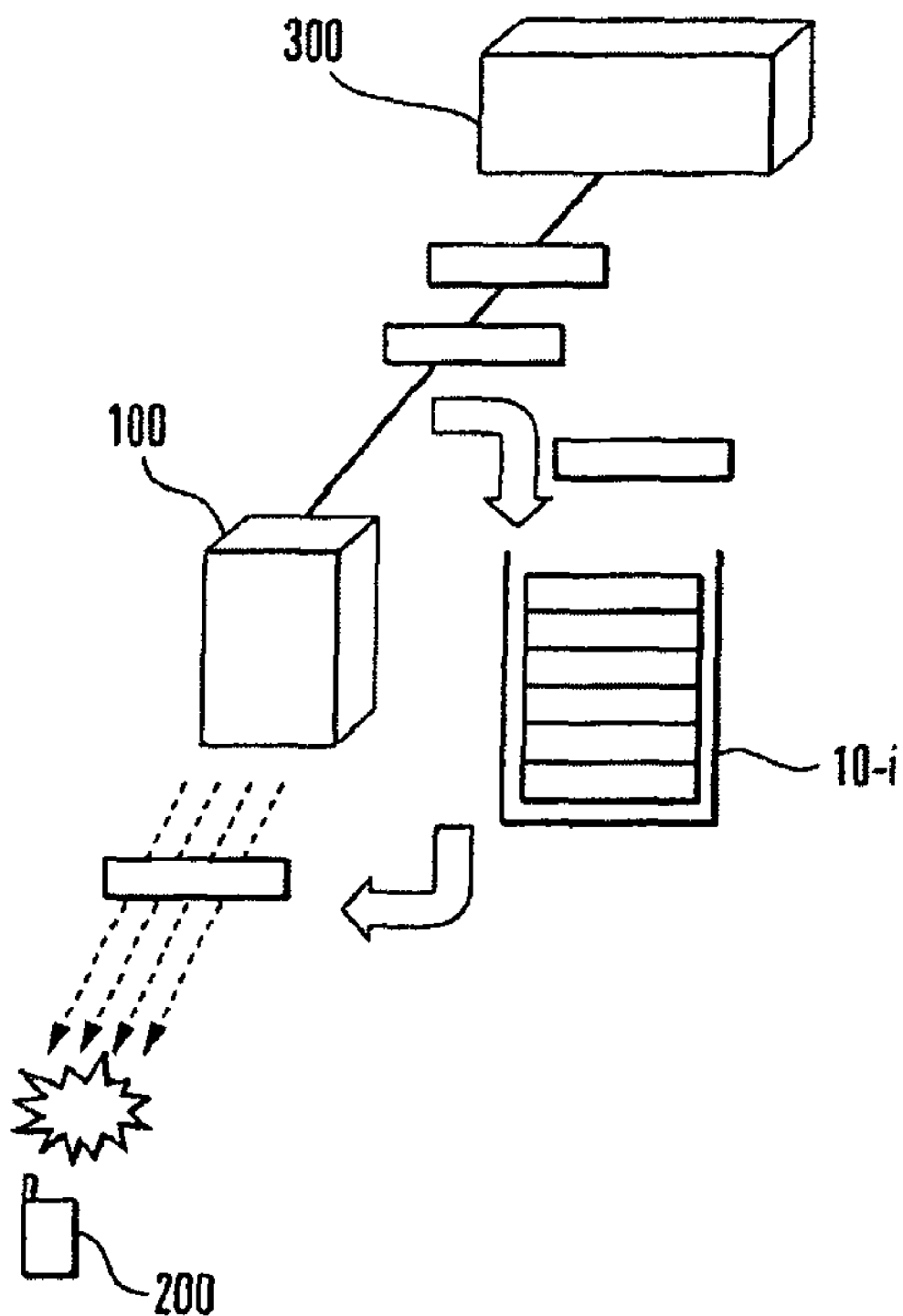
FIG. 1 is a view showing the configuration of a WCDMA mobile communication system to which a base station apparatus according to an exemplary embodiment of the present invention is applied.

A WCDMA mobile communication system to which a base station apparatus 100 according to the exemplary embodiment of the present invention is applied will be explained with reference to FIG. 1. The WCDMA mobile communication system shown in FIG. 1 has the base station apparatus 100, a mobile station terminal 200, and a base station controller (RNC: Radio Network Controller) 300 as a host apparatus of the base station apparatus 100.

The base station apparatus 100 performs packet data communication with a plurality of mobile station terminals including the mobile station terminal 200 by using HS-PD-SCH by the HSDPA method. The base station apparatus 100 has, for each mobile station terminal, a data queue 10-$i$ for temporarily storing data to be transmitted to the mobile station terminal, and stores data received from the base station controller 300 in the data queue 10-$i$ corresponding to a mobile station terminal as the destination.

If the wireless propagation quality is low and data from the base station apparatus 100 cannot reach the mobile station terminal 200, data retransmission control by the HARQ method is performed between the base station apparatus 100 and mobile station terminal 200. That is, if the mobile station terminal 200 has failed to receive data from the base station apparatus 100 because a reception error has occurred in the data, the mobile station terminal 200 requests the base station apparatus 100 to retransmit the data, and the base station apparatus 100 selects the data whose retransmission is requested by the mobile station terminal 200 from the data queue 10-$i$ corresponding to the mobile station terminal 200, and retransmits the selected data. While this retransmission control is performed, the data stored in the data queue 10-$i$ is not discarded for a predetermined period. If the mobile station terminal 200 has successfully received the retransmission data, the base station apparatus 100 discards the data from the data queue 10-$i$.

Figure 2:
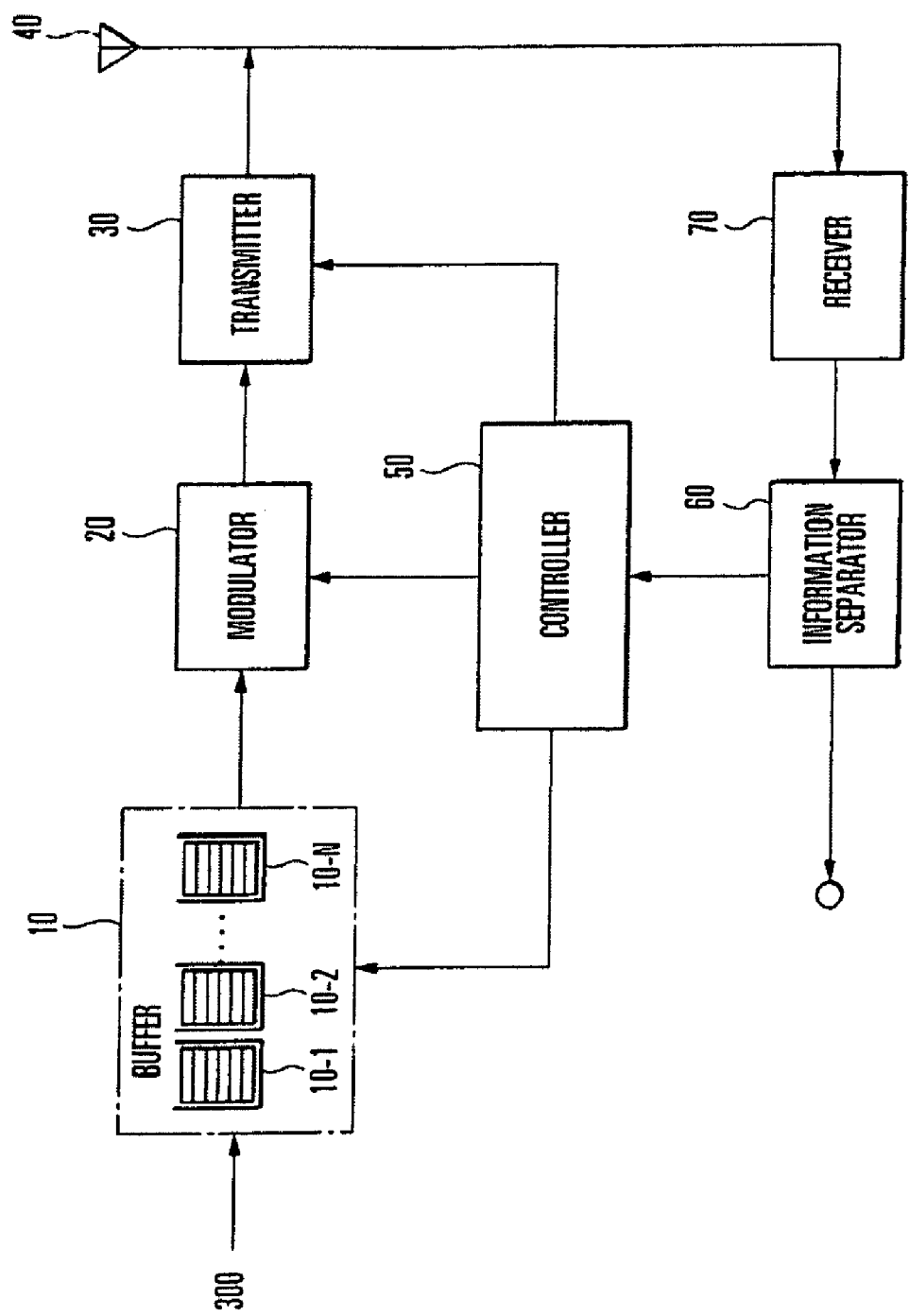
FIG. 2 is a block diagram showing the arrangement of the base station apparatus according to the exemplary embodiment of the present invention.

The arrangement of the base station apparatus 100 will be explained below with reference to FIG. 2. As shown in FIG. 2, the base station apparatus 100 has a buffer (storage means) 10, modulator 20, transmitter 30, antenna 40, controller 50, information separator 60, and receiver 70.

The buffer 10 has, in one-to-one correspondence with mobile station terminals, data queues 10-1 to 10-N for temporarily storing packet data to be transmitted to the mobile station terminals. The modulator 20 modulates data input from the buffer 10, and outputs the modulated data to the transmitter 30. The modulator 20 can select a plurality of modulation methods different in error resistance on wireless propagation, and performs the modulation process by a modulation method designated by the controller 50 (to be described later). The transmitter 30 performs a predetermined wireless transmission process on transmission data from the modulator 20, and transmits the processed data via the antenna 40.

The controller 50 performs scheduling for determining the priority order of transmission of data in the data queues 10-1 to 10-N of the buffer 10, and sequentially outputs the data from the buffer 10 to the modulator 20 in accordance with the scheduling result. Also, the controller 50 has a function of monitoring the data storage amount in each of the data queues 10-1 to 10-N.

The controller 50 selects an optimum modulation method in accordance with the wireless propagation environment between the base station apparatus 100 and each mobile station terminal. When transmitting data to the mobile station terminal 200, for example, the controller 50 selects a modulation method corresponding to the wireless propagation environment between the base station apparatus 100 and mobile station terminal 200, and designates the selected method in the modulator 20. Accordingly, data is transmitted to the mobile station terminal 200 by an appropriate modulation method.

The receiver 70 performs a predetermined wireless receiving process on a signal received via the antenna 40, and outputs the processed signal to the information separator 60. The information separator 60 separates the received signal from the receiver 70 into user information (e.g., a sound signal and image signal) and control information (e.g., a retransmission request), and outputs the user information to each unit (not shown) in the base station apparatus 100 and the control information to the controller 50.

If the wireless propagation quality is low and data from the base station apparatus 100 cannot reach the mobile station terminal 200, as described previously, data retransmission control is performed between the base station apparatus 100 and mobile station terminal 200 by the HARQ method. That is, if the mobile station terminal 200 has failed to receive data from the base station apparatus 100 because a reception error has occurred in the data, the mobile station terminal 200 requests the base station apparatus 100 to retransmit the data.

The controller 50 receives this retransmission request via the antenna 40, receiver 70, and information separator 60. When retransmitting the requested data to the mobile station terminal 200, if the data storage amount in a data queue (e.g., the data queue 10-1) corresponding to the mobile station terminal 200 is equal to or larger than a predetermined threshold value, the controller 50 instructs the modulator 20 to perform modulation by using a modulation method having an error resistance higher than that of a modulation method used at the timing of the last data transmission to the mobile station terminal 200.

For example, if the modulation method used at the timing of the last data transmission to the mobile station terminal 200 is the hexadecimal QAM method, the data is retransmitted to the mobile station terminal 200 by changing the modulation method to the QPSK method having a higher error resistance.

The data retransmission method performed by the base station apparatus 100 will be explained below with reference to FIG. 3. Referring to FIG. 3, if there is a data retransmission request from the mobile station terminal 200 (step S1), the controller 50 checks the data storage amount in the data queue 10-1 corresponding to the mobile station terminal 200. If the data storage amount in the data queue 10-1 is equal to or larger than a predetermined threshold value (YES in step S2), the controller 50 instructs the modulator 20 to perform modulation by using a modulation method having an error resistance higher than that of a modulation method used in the last data transmission to the mobile station terminal 200, when retransmitting the requested data to the mobile station terminal 200 (step S3).

On the other hand, if the data storage amount in the data queue 10-1 corresponding to the mobile station terminal 200 has not reached the predetermined threshold value (NO in step S2), the controller 50 instructs the modulator 20 to perform modulation by using a modulation method corresponding to the wireless propagation environment between the base station apparatus 100 and mobile station terminal 200 as in a normal case, when retransmitting the requested data to the mobile station terminal 200 (step S4).

Note that if the modulation method used in the last data transmission to the mobile station terminal 200 is the QPSK method and there is no modulation method having an error resistance higher than that of the QPSK method, it is of course possible to use the modulation method used in the last data transmission to the mobile station terminal 200.

In this exemplary embodiment as explained above, if the data storage amount in the data queue 10-1 corresponding to the mobile station terminal 200 having requested retransmission of data is equal to or larger than the predetermined threshold value, the data is retransmitted by using a modulation method having a higher error resistance. This allows the mobile station terminal 200 to successfully receive the retransmission data, and makes it possible to reduce the number of times of retransmission. Consequently, it is possible to prevent the inconvenience that data newly received from the base station controller 300 as a host apparatus is not transmitted to the mobile station terminal 200 but stored in the data queue 10-1 for a long time, and the data in the data queue 10-1 is discarded after a predetermined period, thereby inducing retransmission control by an upper layer.

It is also possible to prevent the inconvenience that retransmission occurs many times because the mobile station terminal 200 has failed to receive data, and data overflows from the data queue 10-1 to induce retransmission control by an upper layer.

In the data retransmission method shown in FIG. 3, the error resistance on wireless propagation is increased by changing the modulation method. However, it is also possible to increase the error resistance on wireless propagation by controlling the transmitting power, instead of changing the modulation method. In this case, however, the transmitter 30 must have the ability to change the transmitting power of transmitting data to the mobile station terminal 200 in accordance with an instruction from the controller 50.

Referring to FIG. 4, if there is a data retransmission request from the mobile station terminal 200 (step S11), the controller 50 checks the data storage amount in the data queue 10-1 corresponding to the mobile station terminal 200. If the data storage amount in the data queue 10-1 is equal to or larger than a predetermined threshold value (YES in step S12), the controller 50 instructs the transmitter 30 to increase the transmitting power by a predetermined value from that of the last data transmission to the mobile station terminal 200, when retransmitting the requested data to the mobile station terminal 200 (step S13).

On the other hand, if the data storage amount in the data queue 10-1 corresponding to the mobile station terminal 200 has not reached the predetermined threshold value (NO in step S12), the controller 50 performs a normal operation instead of preferentially giving the transmitting power as in the process of step S13 (step S14).

Note that in step S13, extra power is necessary at the timing of retransmission of the data whose retransmission is requested by the mobile station terminal 200. If there is no extra power, however, it is of course possible to retransmit the data by the transmitting power of the last data transmission to the mobile station terminal 200.

The data retransmission method shown in FIG. 4 can also increase the error resistance on wireless propagation by increasing the transmitting power of transmitting the retransmission data. Accordingly, the same effect as in the data retransmission method shown in FIG. 3 can be obtained.

Note that the modulation method is changed when transmitting the retransmission data in FIG. 3, and the transmitting power is increased when transmitting the retransmission data in FIG. 4. When transmitting the retransmission data, however, it is of course also possible to change the modulation method as shown in FIG. 3 and increase the transmitting power as shown in FIG. 4 by performing both the methods.

Figure 5:
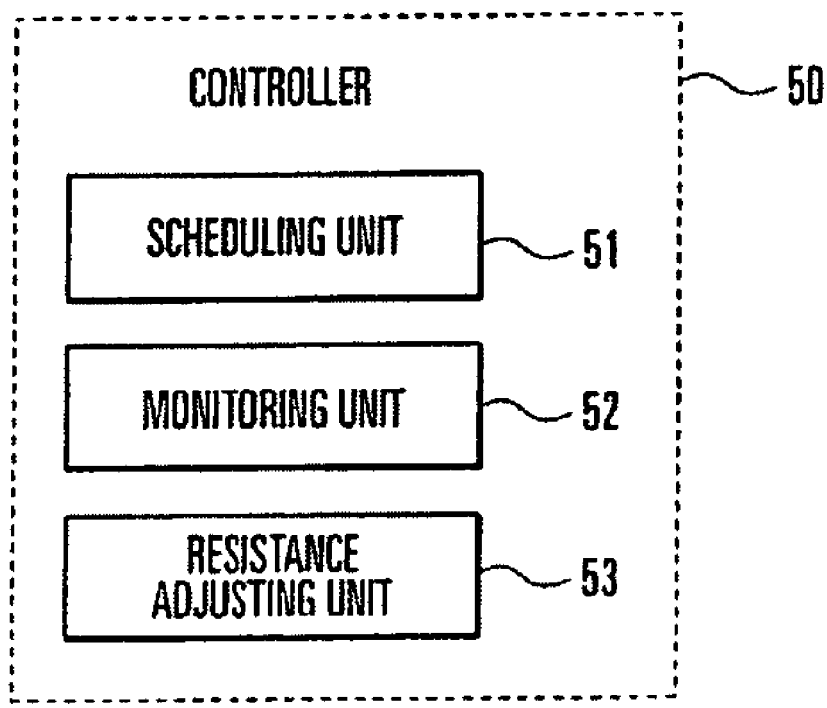
FIG. 5 is a block diagram showing the functional units of a controller shown in FIG. 2.

The functional units of the controller 50 described above can be represented as shown in FIG. 5. The controller 50 shown in FIG. 5 has a scheduling unit 51, monitoring unit 52, and resistance adjusting unit 53. The scheduling unit 51 performs scheduling for determining the priority order of transmission of data in the data queues 10-1 to 10-N of the buffer 10, and causes the buffer 10 to sequentially output the data to the modulator 20 in accordance with the result of this scheduling.

The monitoring unit 52 monitors the data storage amount in each of the data queues 10-1 to 10-N. More specifically, the monitoring unit 52 performs the process of step S2 in FIG. 3 and the process of step S12 in FIG. 4.

When retransmitting data to the mobile station terminal 200, if the monitoring unit 52 detects that the data storage amount in a data queue corresponding to the mobile station terminal 200 is equal to or larger than a predetermined threshold value, the resistance adjusting unit 53 performs control of making the error resistance on wireless propagation higher than that of the last data transmission to the mobile station terminal 200. In the data retransmission method shown in FIG. 3, a modulation method having an error resistance higher than that of a modulation method used in the last data transmission to the mobile station terminal 200 is designated in the modulator 20 as the control of increasing the error resistance (step S3). In the data retransmission method shown in FIG. 4, control of increasing the transmitting power from that of the last data transmission to the mobile station terminal 200 is performed in the transmitter 30 as the control of increasing the error resistance (step S13).

Figure 6:
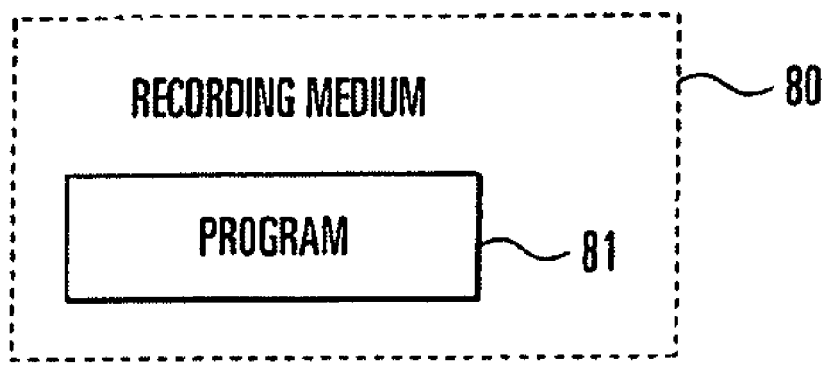
FIG. 6 is a block diagram showing a recording medium storing a program that implements the processing of the base station apparatus shown in FIG. 2.

The processing performed by the base station apparatus 100 in accordance with the flowcharts shown in FIGS. 3 and 4 may also be implemented by allowing a CPU (controller) of a computer to read out and execute a program 81 prestored in a storage medium 80 such as a ROM shown in FIG. 6 in the base station apparatus 100.

The invention claimed is:

1. A base station apparatus comprising:
   a storage unit which temporarily stores data to be transmitted to a mobile station in a data queue corresponding to the mobile station;
   a control unit which performs control of transmitting, to the mobile station, data stored in the data queue corresponding to the mobile station, and control of retransmitting data whose retransmission is requested by the mobile station by selecting the data from the data queue corresponding to the mobile station; and
   an information separator unit which separates a signal transmitted from the mobile station into a user signal including a sound signal and an image signal and control information including a data retransmission request and then outputs the control information to the control unit,
   wherein said control unit includes
   a monitoring unit which monitors a data storage amount in a data queue, and
   resistance adjusting unit which performs, when retransmitting data to the mobile station, control of making an error resistance on wireless propagation higher than that of last data transmission to the mobile station, if said monitoring unit detects that a data storage amount in the data queue corresponding to the mobile station is not less than a predetermined threshold value,
   wherein the base station apparatus further comprises
   modulating unit configured to select a plurality of modulation methods different in error resistance as a method of modulation to be performed on data when transmitting the data to the mobile station,
   wherein as the control of making the error resistance, said resistance adjusting unit designates, in said modulating unit, a modulation method having an error resistance higher than that of a modulation method used in last data transmission to the mobile station.

2. A base station apparatus according to claim 1, further comprising transmitting unit configured to change transmitting power of data transmission to the mobile station,
   wherein as the control of making the error resistance, said resistance adjusting unit causes said transmitting unit to increase the transmitting power from that of last data transmission to the mobile station.

3. A base station apparatus according to claim 1, wherein said storage unit includes a plurality of data queues corresponding to a plurality of mobile stations, and
   said monitoring unit monitors a data storage amount in each of the plurality of data queues.

4. A data retransmission method of a base station apparatus, comprising the steps of:
   temporarily storing data to be transmitted to a mobile station in a data queue corresponding to the mobile station;
   transmitting, to the mobile station, data stored in the data queue corresponding to the mobile station;
   retransmitting data whose retransmission is requested by the mobile station by selecting the data from the data queue corresponding to the mobile station; and
   separating a signal transmitted from the mobile station into a user signal including a sound signal and an image signal and control information including a data retransmission request,
   wherein the step of retransmission includes the steps of
   checking a data storage amount in the data queue when retransmitting data to the mobile station, and
   performing control of making an error resistance on wireless propagation higher than that of last data transmission to the mobile station, if a result of the check indicates that the data storage amount in the data queue corresponding to the mobile station is not less than a predetermined threshold value,
   wherein the step of performing control comprises the step of using a modulation method having an error resistance higher than that of a modulation method used in last data transmission to the mobile station.

5. A data retransmission method of a base station apparatus according to claim 4, wherein the step of performing control comprises the step of increasing transmitting power from that of last data transmission to the mobile station.

6. A storage medium storing a program which causes a computer of a base station apparatus to execute the steps of:
   temporarily storing data to be transmitted to a mobile station in a data queue corresponding to the mobile station;
   performing control of transmitting, to the mobile station, data stored in the data queue corresponding to the mobile station;
   performing control of retransmitting data whose retransmission is requested by the mobile station by selecting the data from the data queue corresponding to the mobile station; and
   performing control of separating a signal transmitted from the mobile station into a user signal including a sound signal and an image signal and control information including a data retransmission request,
   wherein as the step of performing control of retransmission, the program causes the computer to execute the steps of
   checking a data storage amount in the data queue when retransmitting data to the mobile station, and
   performing control of making an error resistance on wireless propagation higher than that of last data transmission to the mobile station, if a result of the check indicates that the data storage amount in the data queue corresponding to the mobile station is not less than a predetermined threshold value,
   wherein the program further causes the computer to execute, as the step of performing control of making the error resistance, the step of using a modulation method having an error resistance higher than that of a modulation method used in last data transmission to the mobile station.

7. A storage medium according to claim 6, wherein the program causes the computer to execute, as the step of performing control of making the error resistance, the step of increasing transmitting power from that of last data transmission to the mobile station.

* * * * *